United States Patent
Patel

(10) Patent No.: US 7,805,713 B2
(45) Date of Patent: Sep. 28, 2010

(54) TRANSACTION PROCESSING ARCHITECTURE

(75) Inventor: Rikin S. Patel, Sterling Heights, MI (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1928 days.

(21) Appl. No.: 10/694,518

(22) Filed: Oct. 27, 2003

(65) Prior Publication Data
US 2005/0091639 A1 Apr. 28, 2005

(51) Int. Cl.
*G06F 9/45* (2006.01)
(52) U.S. Cl. .............. 717/143; 717/106; 717/114; 717/144
(58) Field of Classification Search .............. None
See application file for complete search history.

(56) References Cited

U.S. PATENT DOCUMENTS

| | | | |
|---|---|---|---|
| 6,600,734 B1 | 7/2003 | Gernert et al. | |
| 6,671,272 B2 | 12/2003 | Vaziri et al. | |
| 6,738,461 B2 | 5/2004 | Trandal et al. | |
| 6,747,970 B1 | 6/2004 | Lamb et al. | |
| 6,772,216 B1* | 8/2004 | Ankireddipally et al. | 709/230 |
| 6,801,604 B2 | 10/2004 | Maes et al. | |
| 6,826,174 B1 | 11/2004 | Erekson et al. | |
| 6,839,341 B1 | 1/2005 | Nakajima | |
| 6,971,096 B1* | 11/2005 | Ankireddipally et al. | 718/101 |
| 2002/0035584 A1* | 3/2002 | Scheier et al. | 707/517 |
| 2003/0105887 A1* | 6/2003 | Cox et al. | 709/328 |
| 2003/0110279 A1* | 6/2003 | Banerjee et al. | 709/232 |
| 2003/0172368 A1* | 9/2003 | Alumbaugh et al. | 717/106 |
| 2003/0177271 A1* | 9/2003 | Park | 709/246 |
| 2003/0229554 A1* | 12/2003 | Veres et al. | 705/35 |
| 2004/0059744 A1* | 3/2004 | Duncan et al. | 707/102 |
| 2005/0120039 A1* | 6/2005 | Amys et al. | 707/102 |

OTHER PUBLICATIONS

"Xml schemas in Oracle XML DB", Murthy et al., Sep. 2003, pp. 1009-1018, <http://delivery.acm.org/10.1145/1320000/1315538/p1009-murthy.pdf>.*

"Automatic creation of interface specifications from ontologies", Gurevych et al., May 2003, pp. 59-66, <http://delivery.acm.org/10.1145/1120000/1119235/p59-gurevych.pdf>.*

"Conceptual modeling of XML schemes", Loscio et al., Nov. 2003, pp. 102-105, <http://delivery.acm.org/10.1145/960000/956722/p102-loscio.pdf>.*

* cited by examiner

*Primary Examiner*—Tuan Q Dam
*Assistant Examiner*—Thuy Dao

(57) ABSTRACT

One aspect of the invention is a transaction processing system comprising a software service operable to receive a transaction request and to generate a first object associated with the transaction request. An object generator may convert the first object into a first document written in a self-describing language. A document generator may convert the first document into a first transaction message according to a schema associated with a first transaction type determinable from the first document.

21 Claims, 3 Drawing Sheets

TRANSACTION PROCESSING ARCHITECTURE

TECHNICAL FIELD OF THE INVENTION

This invention relates generally to transaction processing and more particularly to a method and system for processing transactions in a network environment.

BACKGROUND OF THE INVENTION

Many large organizations, such as corporations, have invested substantial resources in the development of computer systems running on large mainframe computers. Many of these systems are legacy systems that are maintained for one or more reasons. For example, their replacement may be extremely expensive and/or cause a disruption of the business of the owner of such systems.

Many legacy systems utilize message format services wherein a transaction may be performed with the legacy system by sending the system a message comprising an ASCII (or EBCDIC) string which may contain, for example, a command word and one or more parameters for the transaction in question. In response to receiving such a command, a legacy system may generate an output transaction which may also typically comprise a command word and one or more parameters. Many of these systems do not contain modular architectures and are expensive to modify to provide additional functionality. In addition, the security for such systems often does not allow an easy method for allowing third party access to such systems in a secure manner. Creating an effective and dynamic interaction between legacy systems and various other applications may also be difficult and expensive due to the nature of these systems.

SUMMARY OF THE INVENTION

One aspect of the invention is a transaction processing system comprising a software service operable to receive a transaction request and to generate a first object associated with the transaction request. An object generator may convert the first object into a first document written in a self-describing language. A document generator may convert the first document into a first transaction message according to a schema associated with a first transaction type determinable from the first document.

The invention has several important technical advantages. Various embodiments of the invention may have none, one, some, or all of these advantages without departing from the scope of the invention. The invention allows an automated web service interface to a legacy system to be created quickly and efficiently. The invention allows information in legacy systems to be exposed to third parties without substantial reprogramming of legacy systems and/or intervening systems. In addition, the information may be exposed in a way that protects the security of the legacy system without making modifications to the legacy system. The invention also employs a modular architecture that allows for rewriting of applications at various levels of the architecture without substantial effects on applications at other levels in the architecture. The architecture builds upon component architectures and allows rapid assembly of components across platform and organizational boundaries. In summary, the invention allows an organization to quickly develop web services that can make use of legacy platforms without substantial alterations to those platforms.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

Figure 1:
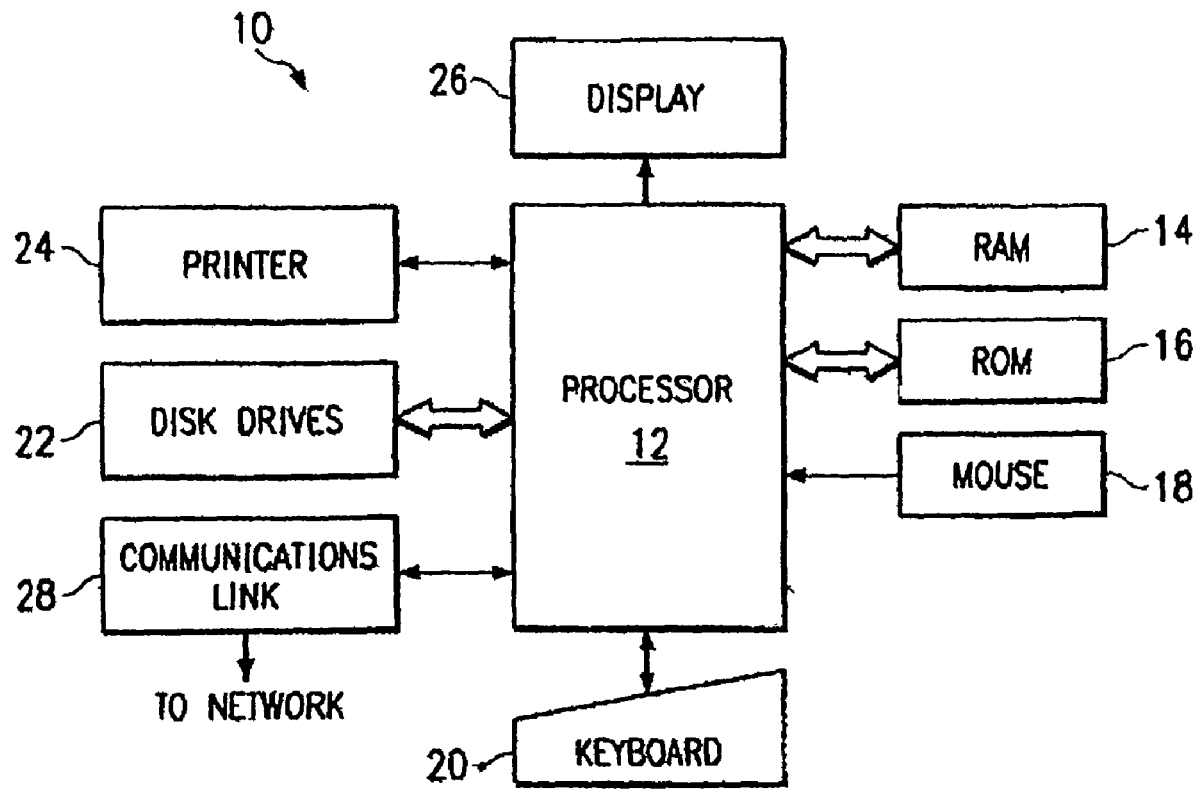
FIG. 1 illustrates a block diagram of a general purpose computer that may be used in accordance with the present invention.
Figure 2:
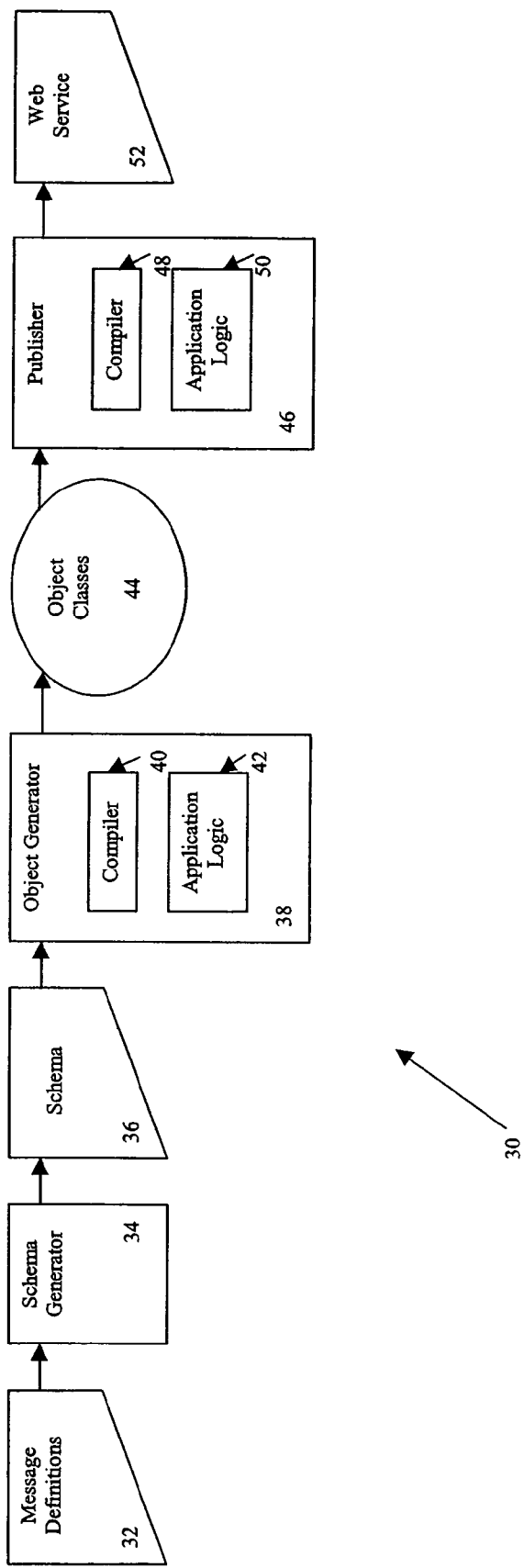
FIG. 2 illustrates an example architecture that may be used to create the infrastructure to support a web service interface to a legacy system.
Figure 3:
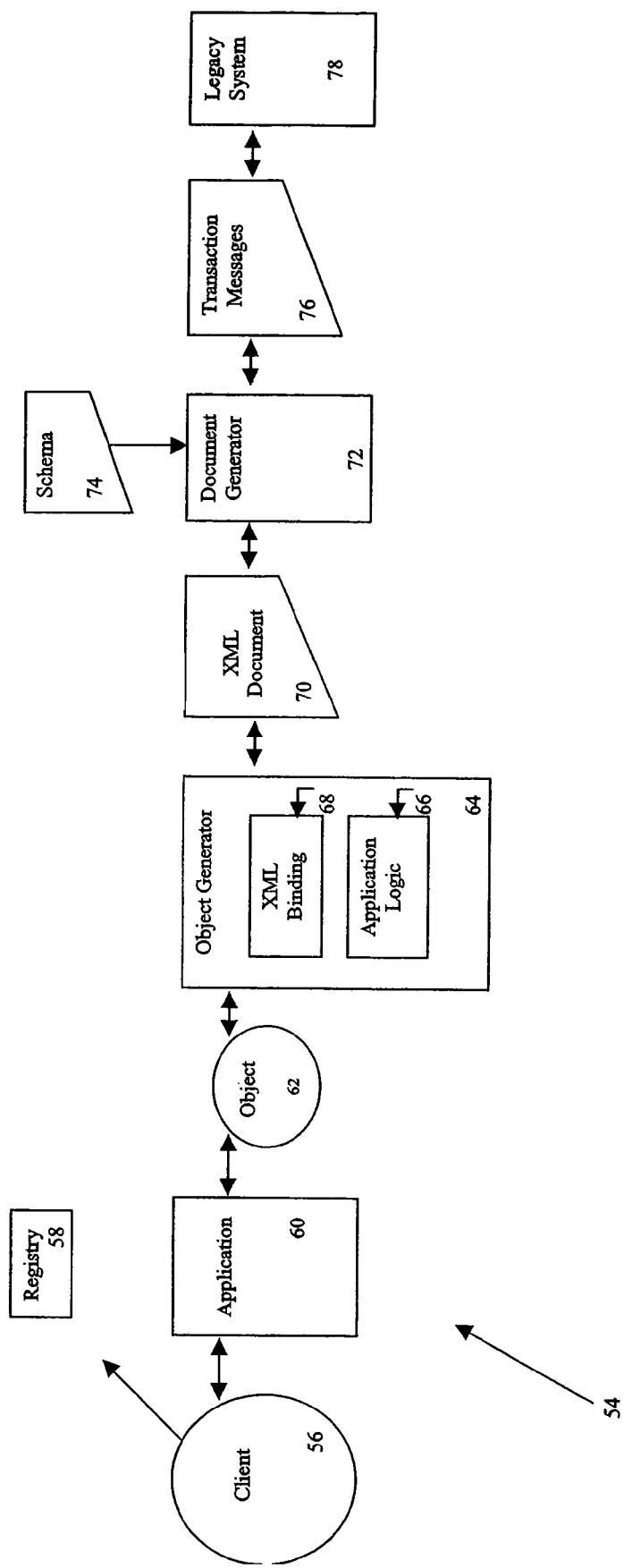
FIG. 3 illustrates an example architecture illustrating the operation of a web service interface to a legacy system.

The preferred embodiment of the present invention and its advantages are best understood by referring to FIGS. 1 through 3 of the drawings, like numerals being used for like and corresponding parts of the various drawings.

FIG. 1 illustrates a general purpose computer 10 that may be used in connection with one or more of the pieces of software employed by the present invention. General purpose computer 10 may be adapted to execute any of the well-known OS2, UNIX, MAC-OS, LINUX, and Windows Operating Systems or other operating systems. General purpose computer 10 comprises processor 12, random access memory (RAM) 14, read-only memory (ROM) 16, mouse 18, keyboard 20 and input/output devices such as printer 24, disk drives 22, display 26, and communications link 28. The present invention may include programs that may be stored in RAM 14, ROM 16, or disk drives 22 and may be executed by processor 12. Communications link 28 may be connected to a computer network but could be connected to a telephone line, an antenna, a gateway, or any other type of communication link. Disk drives 22 may include a variety of types of storage media such as, for example, floppy disk drives, hard disk drives, CD-ROM drives or magnetic tape drives. Although this embodiment employs a plurality of disk drives 22, a single disk drive 22 could be used without departing from the scope of the invention. FIG. 1 provides one example of a computer that may be used with the invention. The invention could be used with computers other than general purpose computers as well as general purpose computers without conventional operating systems.

The invention includes logic contained within a medium. In this example, the logic comprises computer software executable on a general purpose computer. The media may include one or more storage devices associated with general purpose computer 10. The invention may be implemented with computer software, computer hardware or a combination of software and hardware. The logic may also be embedded within any other medium without departing from the scope of the invention.

The invention may employ multiple general purpose computers 10 networked together in a computer network. Most commonly, multiple general purpose computers 10 may be networked through the Internet and/or in a client server network. The invention may also be used with a combination of separate computer networks each linked together by a private or public network.

FIG. 2 illustrates an architecture that may be used to set up a web service link to a legacy system in an automated fashion. Architecture 30 may be most useful to create a web service that can interact with a legacy system which uses a message format service to conduct transactions. The components of architecture 30 may comprise software applications and data stored on one or more computers that are connected by a network and/or other communication links. Any arrangement of software and data on the various computers may be made without departing from the scope of the invention. Data could also be manually transported between computers without departing from the scope of the invention.

Generally, a legacy system using a message format system will communicate with users of the system using inbound and outbound messages. Each inbound and outbound message typically comprises an ASCII (or EBCDIC) string comprising a command word and one or more parameters associated with the command. In some legacy systems, all parameters associated with a command must be included, while in other legacy systems some or all of the parameters may be optional parameters. The invention may be used with any type of message format (whether a text message or non-text message format). While most message formats will be text messages (most often ASCII or EBCDIC), a different type of message format may also be used without departing from the scope of the invention.

In some legacy systems, an electronic computer file may include all of the various inbound and outbound message format definitions for all of the possible transactions which may take place using the legacy system. Where such a file does not exist, one can be created. Multiple message definition files 32 could also be used. The invention employs a schema generator 34 to create one or more schema 36 that may be used to translate one or more messages into a document written in a self-describing language. In this embodiment, schema generator 34 processes each inbound and outbound message type in message definitions file 32 and generates a corresponding schema 36 that may be used to translate messages into XML documents or to translate an XML document into an appropriate message to submit to the legacy system. Although this embodiment generates schema for creating XML documents (or messages from XML documents), schema generator 34 could be designed to generate schema for any type of self-describing language. For example, schema generator 34 could be used to generate schema 36 for XML documents, HTML documents, any self-describing language employing hypertext, and any versions of any of the foregoing. In some embodiments, schema generator 34 will process IMS message definitions usable with IBM's IMS language. However, schema generator 34 could be designed to process any type of message format definition contained within message definition file 32.

The schema 36 created by schema generator 34 may be used when the web service is running (as described in more detail with respect to FIG. 3) to translate messages generated by the legacy system into XML documents or to translate XML documents into messages for the legacy system. By using a schema generator 34 to automatically generate schema 36, an interface to a legacy system using a message format system may be quickly developed in an automated fashion. If desired, the schema 36 generated by schema generator 34 may be enhanced to handle multiple types of messages and/or to generate multiple messages based upon a single XML document. Accordingly, while there can be a one-to-one correspondence between schema 36 and message types in message definition file 32, the relationship does not necessarily have to be one to one.

For security purposes, the operator of a legacy system may choose to prevent one or more types of message commands (or subcapabilities within a command) from being included in the web service, (e.g. commands which delete data). Any suitable method can be used to accomplish this. First, before the schema 36 are generated, one might edit message definition file 36 to delete or modify messages that should not be included in a web service. Second, various schema could be removed (or modified) after they are generated. Third, the appropriate objects could be removed, etc. Any method may be used to limit the functionality of the legacy system available to the web service without departing from the scope of the invention.

In operation, schema generator 34 parses the transaction definitions contained within message definitions file 32. Schema generator 34 then creates a schema 36 for some or all of the transaction definitions. Some of the schema 36 may be operable to map one or more parameters associated with a transaction definition to a document written in a self-describing language. This type of schema definition is created for messages that are outputs from the legacy system. For messages that are inputs to the legacy system, a schema 36 may map a document written in the self-describing language to a transaction message including one or more parameters associated with that particular type of message. Thus, the schema 36 serve as translators from the message format language to the self-describing language and vice versa. The relevant schema 36 may be used to create object classes to facilitate the creation of a web service. Assuming that the legacy system does not change and there is no desire to change the web service, the generation of schema may only need to occur once.

The schema 36 created by schema generator 34 may be supplied to object generator 38, which creates object classes 44 based on the collection of schema 36. Application logic 42 may also be created, optionally, to facilitate the interface between web clients and the web service being created for the legacy system. The application logic 42 and schema 36 may then by used by the compiler 40 and object generator 38 to create object classes. Object generators, such as object generator 38, may comprise any suitable object generator 38 such as those commercially available to create object classes based upon XML documents.

After object classes 44 are created, publisher 46 may be used to abstractly describe each object's methods and instance variables and to create objects publishable as a web service 52. The publisher may employ a concrete network protocol and message format to facilitate the operation as a web service. In this embodiment, the web service employs the web services definition language (WSDL) but any type of language could be used without departing from the scope of the invention. In addition, variations of WSDL may be used without departing from the scope of the invention. Publisher 46 may also use application logic 50 (which is optional) to facilitate an application interface that may be accessed using the web service. Publisher 46 may use application logic 50 and object classes 44 to compile the relevant definitions for the web service 52. Publisher 46 may compile the web service using compiler 48. One of ordinary skill in the art will recognize that commercially available publisher tools may be used for publisher 46.

After the infrastructure to facilitate a web service interface to a legacy application has been created using, for example, the tools and architecture illustrated in FIG. 2, then the web service may be used to access the legacy system.

FIG. 3 illustrates an architecture 54 of a system that may be used to process transactions received from a web client to be handled by a legacy system.

In this embodiment, client 56 may obtain information about the web service (which was generated in accordance with the invention described in FIG. 2 or otherwise) from registry 58. Registry 58 may be, for example, a UDDI registry. This information may be obtained either at run time or during the time that client 56 is being created. For relatively static interface definitions, the information may be obtained from registry 58 while client 56 is being created. However, where the interface to the web service encounters frequent changes, then client 56 may obtain the most current interface definitions from registry 58. Based upon the web service definitions obtained from registry 58, client 56 may generate a transaction request and send that transaction request to application 60.

Application 60 typically comprises a software service that receives a web service request from a client 56 and converts that service request to an object 62. Application 60 may include appropriate security features to control the clients 56 from which valid transaction requests may be received. Note that security may also be controlled by automatically or manually adjusting the definitions of the web service provided to registry 58. Because clients 56 obtain information as to how to access the legacy system as a web service through registry 58, only the interface exposed to client 56 through registry 58 may be used to gain access to the legacy system. Application 60 may also be written such that it only creates an object 62 for a limited subset of potential transactions available for the web service that is defined in registry 58. Also, particular transaction types could be restricted to particular clients 56.

Most typically, client 56 will reside on a computer (or computers) separate from registry 58 and/or application 60. However, the relevant software could reside on the same computer without departing from the scope of the invention. In addition, other portions of the architecture 54 illustrated in FIG. 3 may reside on one or more computers without departing from the scope of the invention. Any software and/or data files used with the present invention may reside on multiple computers or a single computer without departing from the scope of the invention.

After application 60 has generated object 62, then object generator 64 may generate an XML document 70 based upon object 62. In this embodiment, object generator 64 employs XML binding software 68 (such as is commercially available) to create XML document 70. As noted above, any type of self-describing language may be used without departing from the scope of the invention including without limitation XML, versions of XML, HTML, versions of HTML, any self-describing hypertext-based language, and/or any other self-describing language.

Optionally, object generator 64 may also include application logic 66 to aid in creating XML document 70 based upon the contents of object 62. Once the XML document 70 has been generated, document generator 72 may access the schema 74 corresponding to the type of XML document 70 that was generated by object generator 64. Document generator 72 may then use the appropriate schema 74 to generate one or more transaction messages 76 based upon XML document 70. In some embodiments, document generator 72 may use application logic to identify the appropriate schema 74 for translating XML document 70 into a transaction message 76. The transaction message or messages 76 may then be sent to legacy system 78 for processing.

Where legacy system 78 uses EBCDIC messages, document generator 72 may translate text from XML document 70 into the EBCDIC format for message or messages 76. Another software tool could be used for such a conversion if, for example, document generator 72 generates message or messages 76 in ASCII format. An ASCII to EBCDIC translator (not explicitly shown) could then translate the output of document generator 72 into EBCDIC for transmission to legacy system 78. Of course, such software could also reside on a different computer or on legacy system 78 itself. Similar translation options could also be employed for any text or message format used by legacy system 78 and/or document generator 72.

Based upon the transaction message 76, legacy system 78 may process the transaction and generate an output transaction message in response to the input transaction message it received. Where legacy system 78 generates an output transaction message, that transaction message 76 is provided to document generator 72.

Where legacy system 78 uses EBCDIC text coding, the output transaction message 76 could be translated to ASCII by document generator 72 or by separate software. Any of the options discussed above for translation of an input message 76 for legacy system 78 may also be employed in reverse for output messages 76.

After receiving the output transaction message, document generator 72 then accesses the appropriate schema 74 associated with the type of transaction contained within the transaction message 76. Based upon the appropriate schema 74, document generator 72 then translates the transaction into a document written in a self-describing language. In this embodiment document generator 72 generates an XML document 70. In some embodiments, document generator 72 may employ application logic to apply the appropriate schema to translate between the output message 76 and XML document 70.

XML document 70 is then provided to object generator 64 which may use the XML document 70 to generate an object 62 based upon the XML document 70. In some embodiments, application logic 66 may be used to aid in creating object 62 from XML document 70. In an alternative embodiment, an XML document 70 could be provided directly to application 60 and/or client 56 without departing from the scope of the invention.

After object generator generates object 62, application 60 uses object 62 to provide data back to client 56.

Although the present invention has been described in detail, it should be understood that various changes, substitutions and alterations can be made hereto without departing from the sphere and scope of the invention as defined by the appended claims.

To aid the patent office, and any readers of any patent issued on this application in interpreting the claims appended hereto, applicants wish to note that they do not intend any of the appended claims to invoke paragraph 6 of 35 U.S.C. § 112 as it exists on the date of filing hereof unless "means for" or "step for" are used in the particular claim.

What is claimed is:

1. A method for generating a plurality of schema definitions, comprising:
    parsing, in a computer, a plurality of transaction definitions for a software system, wherein each transaction definition comprises one or more parameters; and
    generating, by the computer, in response to parsing the plurality of transaction definitions, a plurality of schema definitions for at least of portion of the parsed transaction definitions, wherein the schema definitions are written in a self-describing language;
    wherein a first schema definition is operable to map the one or more parameters associated with a first transaction definition to a first document written in the self-describing language; and
    wherein a second schema definition is operable to map a second document written in the self-describing language to the one or more parameters associated with a second transaction definition.

2. The method of claim 1, wherein the self-describing language comprises Extensible Markup Language (XML) or any version thereof.

3. The method of claim 1, wherein the self-describing language comprises HyperText Markup Language (HTML) or any version thereof.

4. The method of claim 1, wherein the transaction definitions are associated with a message format service.

5. A schema generator, comprising:
a computer readable storage medium;
computer software stored on the computer readable storage medium and operable to:
- parse a plurality of transaction definitions for a software system, wherein each transaction definition comprises one or more parameters; and
- generate, in response to parsing the plurality of transaction definitions, a plurality of schema definitions for at least a portion of the parsed transaction definitions, wherein the schema definitions are written in a self-describing language;

wherein a first schema definition is operable to map the one or more parameters associated with a first transaction definition to a first document written in the self-describing language; and wherein a second schema definition is operable to map a second document written in the self-describing language to the one or more parameters associated with a second transaction definition.

6. The schema generator of claim 5, wherein the self-describing language comprises Extensible Markup Language (XML) or any version thereof.

7. The schema generator of claim 5, wherein the self-describing language comprises HyperText Markup Language (HTML) or any version thereof.

8. The schema generator of claim 5, wherein the self-describing language comprises a language that employs hypertext.

9. The schema generator of claim 5, wherein the software system comprises an Information Management System (IMS).

10. The schema generator of claim 5, wherein the transaction definitions are associated with a message format service.

11. The schema generator of claim 10, wherein the self-describing language comprises Extensible Markup Language (XML) or any version thereof.

12. A transaction processing system comprising:
a computer readable storage medium to store first and second schema definitions generated based on transaction definitions of transactions at a target system, wherein the first schema definition is to map one or more parameters associated with a first of the transaction definitions to a document written in a self-describing language, and wherein the second schema definition is to map a document written in the self-describing language into one or more parameters associated with a second of the transaction definitions;
one or more processors;
a software service executable on the one or more processors to receive a transaction request from a requestor and to generate a first object associated with the transaction request;
an object generator executable on the one or more processors to convert the first object into a first document written in the self-describing language; and
a document generator executable on the one or more processors to convert the first document into a first transaction message according to the first schema definition associated with a first transaction type determinable from the first document, wherein the first transaction message is to be sent to the target system;
wherein the document generator is executable to further receive, from the target system, a response message that is responsive to the first transaction message, and convert the response message into a second document according to the second schema definition, wherein the second document is written in the self-describing language;
wherein the object generator is executable to further generate a second object from the second document; and
wherein the software service is executable to use the second object to provide, to the requestor, data responsive to the transaction request.

13. The transaction processing system of claim 12, wherein the self-describing language comprises Extensible Markup Language (XML) or any version thereof.

14. The transaction processing system of claim 12, wherein the self-describing language comprises HyperText Markup Language (HTML) or any version thereof.

15. The transaction processing system of claim 12, wherein the transaction generator is further executable to send the first transaction message to a message format service to convert the first transaction message into a format used by the target system.

16. The transaction processing system of claim 12, wherein the software service comprises a web service and wherein the definition of the first object has been published in a registry.

17. A method for processing a transaction, comprising:
storing first and second schema definitions generated based on transaction definitions of transactions at a target system, wherein the first schema definition is to map one or more parameters associated with a first of the transaction definitions to a document written in a self-describing language, and wherein the second schema definition is to map a document written in the self-describing language into one or more parameters associated with a second of the transaction definitions;
receiving, by a computer, a transaction request from a requestor;
generating, by the computer, a first object associated with the transaction request;
converting, by the computer, the first object into a first document written in the self-describing language;
converting the first document into a first transaction message according to the first schema definition associated with a first transaction type determinable from the first document;
sending the first transaction message to the target system;
receiving, from the target system, a response message that is responsive to the first transaction message;
converting the response message into a second document according to the second schema definition, wherein the second document is written in the self-describing language;
generating a second object from the second document; and
using the second object to provide, to the requestor, data responsive to the transaction request.

18. The method of claim 17, wherein the self-describing language comprises Extensible Markup Language (XML) or any version thereof.

19. The method of claim 17, wherein the self-describing language comprises HyperText Markup Language (HTML) or any version thereof.

20. The method of claim 17, further comprising:
sending the first transaction message to a message format service to convert the first transaction message into a format used by the target system.

21. The method of claim 17, wherein the first object is generated by a web service and wherein the definition of the first object has been published in a registry.

* * * * *

UNITED STATES PATENT AND TRADEMARK OFFICE
CERTIFICATE OF CORRECTION

PATENT NO. : 7,805,713 B2  Page 1 of 1
APPLICATION NO. : 10/694518
DATED : September 28, 2010
INVENTOR(S) : Rikin S. Patel It is certified that error appears in the above-identified patent and that said Letters Patent is hereby corrected as shown below:

In column 6, line 49, in Claim 1, delete "at least of" and insert -- at least a --, therefor.

Signed and Sealed this
Eighth Day of March, 2011

David J. Kappos
*Director of the United States Patent and Trademark Office*